Sept. 16, 1958  B. J. POWELL  2,851,900
PARKING BRAKE ASSEMBLY
Filed Nov. 25, 1955
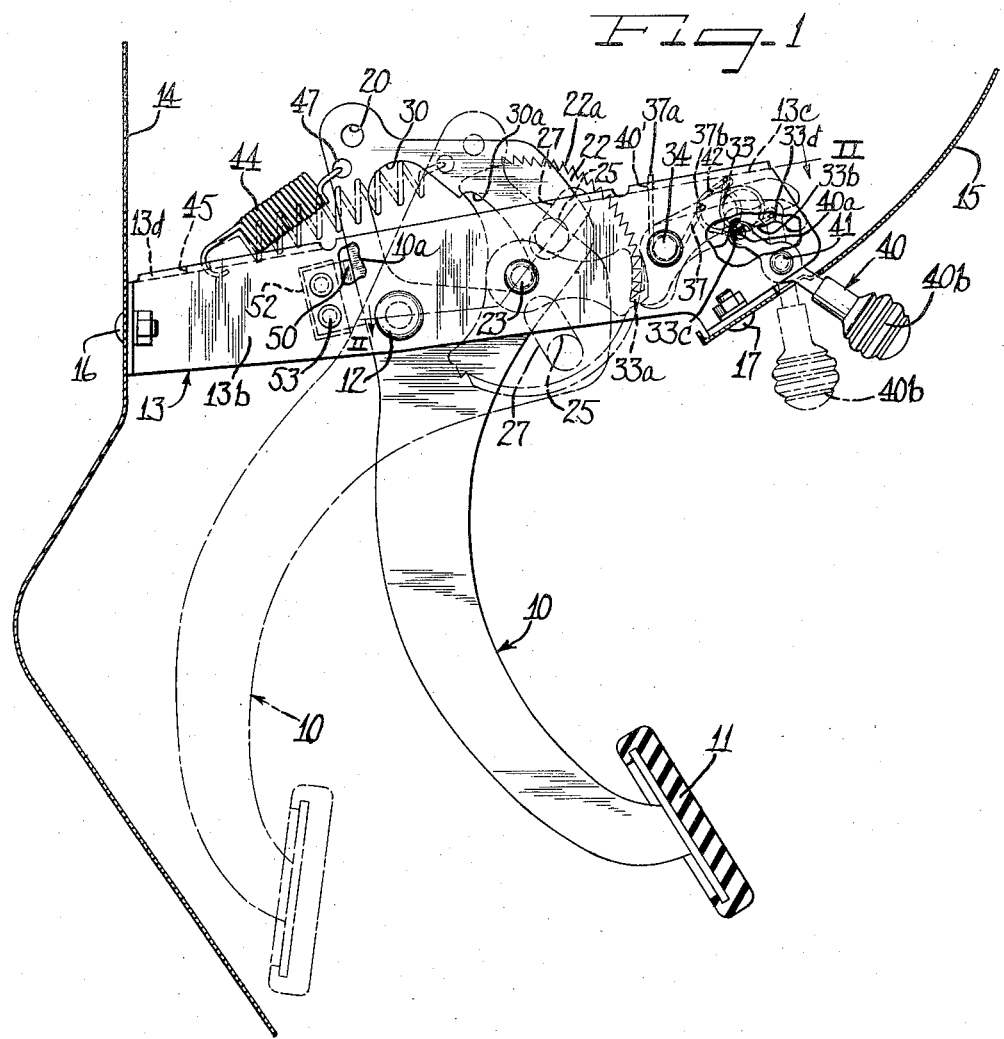
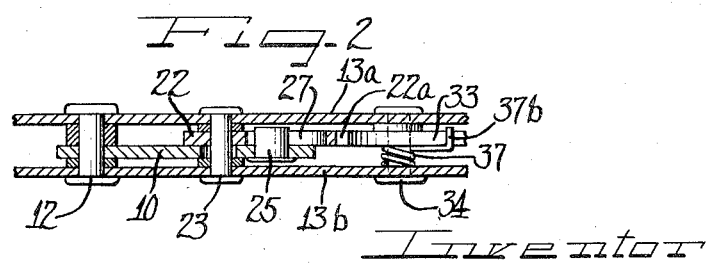
Inventor
Burnet J. Powell

United States Patent Office 2,851,900
Patented Sept. 16, 1958

2,851,900

PARKING BRAKE ASSEMBLY

Burnet J. Powell, Berkley, Mich., assignor, by mesne assignments, to The Bingham-Herbrand Corporation, a corporation of Ohio Application November 25, 1955, Serial No. 549,051

6 Claims. (Cl. 74—542)

This invention relates to a parking brake assembly, and particularly to a parking brake assembly especially adapted for use as a running brake in emergencies.

It is an object of the present invention to provide a novel and improved brake assembly for a vehicle which is especially adapted for operation as a parking brake while the vehicle is stationary and as a running brake while the vehicle is in motion.

It is another object of the present invention to provide a brake actuating assembly wherein release of the brakes from brake setting condition requires a minimum of applied force.

It is still another object of the present invention to provide a foot operated brake lever assembly having means for retaining the brake applying lever in successive attained positions, wherein a particularly simple and inexpensive means is provided for releasing the brake retaining means when the brake is in set condition or for maintaining the brake retaining means in a released condition while the vehicle is in motion.

In accordance with an embodiment of the invention, a brake actuating assembly includes a brake applying means which may be retained in a brake setting position to which moved, and wherein a pivotal member is supplied for hand actuation to release the retention mechanism and to maintain the retention mechanism in release condition during running of the vehicle.

Other and further important objects, features and advantages of the present invention will be apparent from the following detailed description taken in connection with the accompanying drawings, in which:

Figure 1 is a side elevational view illustrating an embodiment of a vehicle brake actuating assembly in accordance with the present invention with parts of the vehicle being shown in section; and Figure 2 is a fragmentary longitudinal sectional view taken generally along the line II—II of Figure 1.

As shown on the drawings:

By way of illustrative example, an embodiment of the present invention is illustrated in conjunction with a pivotally mounted foot operated brake lever 10 having a foot pad 11 for receiving the foot of the operator during actuation of the brakes. The lever 10 is pivotally mounted by means of a rivet 12 carried by a mounting bracket 13. The brake applying assembly is carried as a preassembled unit by the bracket 13 and is adapted to be assembled between a fire wall 14 and an instrument panel 15 of the vehicle by means of suitable fastening elements such as 16 and 17 as illustrated in Figure 1. The brake lever 10 is connected to a brake actuating cable (not shown) by means of an aperture 20 at the upper end thereof, the cable generally extending through the fire wall 14 and downwardly so that a retraction of the brake actuating cable applies a brake setting force to the parking brake mechanism of the vehicle, for example.

In utilizing the brake applying mechanism as a parking brake, it is of course necessary to retain the brake lever 10 in its brake setting position indicated in dot-dash outline in Figure 1. To this end, a ratchet sector 22 is pivotally mounted by means of a rivet 23 between the side plates 13a and 13b of bracket 13. For causing the ratchet sector 22 to rotate with the brake lever 10, the brake lever carries a stud 25, which as best seen in Figure 2 is secured with the brake lever 10 and projects into a radial slot 27 in the ratchet sector 22. As seen in Figure 1, as the brake lever 10 is moved toward its brake setting position, the stud or pin 25 pivots the ratchet sector 22 with the stud moving radially of the pin 23 to the outer end of the slot 27. The brake lever 10 may be provided with a recess 30 having a portion 30a accommodating the rivet 23 as the lever 10 pivots about the rivet 12. In this way, the rivet 23 may cooperate with the wall of the slot 30a to provide stops at the opposite extremes of travel of the lever 10.

For cooperating with the teeth 22a of the ratchet sector 22 to retain the brake lever 10 in an attained position, a pawl 33 is pivotally mounted by means of a rivet 34 and has a tooth 33a which is illustrated as being in engageable relation to the teeth 22a. For urging the pawl 33 clockwise about the rivet 34 into the ratcheting relation shown, a wire spring 37 is wrapped about the shank of rivet 34 as illustrated in Figure 2 and has one end portion 37a extending through an aperture 40' in a horizontal web portion 13c of bracket 13, and has an opposite end portion 37b engaging the top surface of the pawl 33 to urge the same downwardly.

For moving the pawl out of engageable relation to the ratchet sector 22 to release the brake, a pivotal actuating member 40 is provided pivoted to the bracket 13 adjacent the side wall 13a by means of a pin 41 and having a rounded end portion 40a adapted to cooperate with a cam surface 33b formed on the undersurface of the pawl 33. As the handle portion 40b of the actuator 40 is moved downwardly toward the dot-dash position, the actuating head 40a coacts with the surface 33b to move the pawl tooth 33a out of engageable relation to the ratchet teeth 22a. The cam surface 33b is provided with recess portions 33c and 33d at the opposite extremes of movement of the head 40a for tending to interlock the head with the cam surface in the respective extreme positions of the actuator 40. Thus, the pawl disabling position of the actuator or control 40 shown in dot-dash outline in Figure 1 is a relatively stable position, particularly since the weight of the control 40 is largely at the handle end thereof.

For returning the brake lever 10 to its non-brake setting position in cooperation with the tension on the brake cable, a spring 44 may be provided which extends through an aperture 45 in a web portion 13d of the bracket 13 and has its opposite end hooked through an aperture 47 in the upper part of the brake lever 10. Cushioning means as indicated at 50 in Figure 1 may be carried by a housing 52 clamped to the side wall 13b by means of rivets 53 and may be made of a resilient material so as to cushion the cooperating aligned part 10a of the brake lever at the end of the release stroke of the brake lever.

For maintaining the control 40 in its extreme positions, an over center spring 42 has one end anchored in bracket 13 and the opposite end connected to the head 40a of control 40. When control 40 is in the position shown in solid outline in Figure 1, spring 42 maintains the control knob 40 fixed in this position as the pawl tooth 33a rides over the successive ratchet teeth 22a during application of the brakes.

In operation of the illustrated embodiment, it will be understood that while the vehicle is running, the control 40 is maintained in its dot-dash outline position with the knob 40b in its lower position to maintain the pawl 33 out of engageable relation to the ratchet sector 22. Thus, if in an emergency, the brake lever 10 is actuated, the lever will not be locked in its setting position but will release as soon as the operator releases his foot from the pedal 11. If now, the vehicle is brought to rest, and it is desired to use the structure as a parking brake, the handle 40b is moved to its solid outline position in Figure 1 and the over center spring 42 snaps over to retain the control 40 in this position during ratcheting oscillation of the pawl 33 as the foot pedal 11 is depressed by the operator. Whenever the retaining mechanism including pawl 33 and ratchet 22 is released by moving the control 40 in the clockwise direction, the control 40 automatically assumes a position holding the retaining mechanism out of retaining relation and is held in this position by gravity, by the cooperation of spring 37 and depression 33d and by the action of over center spring 42, so that the brake assembly may be actuated during running of the vehicle without the danger of panic lock of the brakes.

It will be apparent that many modifications and variations may be effected without departing from the scope of the novel concepts of the present invention. For example, the invention may be applied to a straight pull type brake lever assembly.

I claim as my invention:

1. In a brake actuating assembly, a foot-operated brake lever, bracket means pivotally mounting said lever, ratchet means movable with said lever, pawl means pivotally mounted by said bracket means and movable from a first position in engageable relation to said ratchet means to a second position out of engageable relation to said ratchet means, cam means operatively associated with said pawl means, and a release lever pivotally mounted by said bracket means and engageable with said cam means to move said pawl means to said second position, said cam means comprising a cam surface on said pawl means with which said release lever engages as the release lever is pivoted toward a pawl release position to cam said pawl means toward second position, and said cam surface having a depression for tending to lock said release lever in pawl release position, and spring means urging said pawl means toward first position to tend to lock said release lever in said depression.

2. In a brake actuating assembly, an elongated bracket, a brake lever pivotally mounted to said bracket and depending therefrom and having a foot pedal at the lower end thereof for actuation by the foot of an operator, a ratchet sector having a series of ratchet teeth pivotally mounted by said bracket and coupled to said brake lever for pivotal movement therewith, a pawl member having a pawl tooth disposed for cooperation with said ratchet teeth and pivotally mounted to said bracket for movement from a ratchet-engaging position to a ratchet-release position, spring means urging said pawl member into ratchet-engaging position, a hand operated control lever pivotally mounted by said bracket and having a lower end disposed for actuation by the hand of the operator and having an upper end disposed for cooperation with a lower edge surface of said pawl member, said edge surface being of a contour to require pivoting of said pawl member from ratchet engaging to ratchet release position upon pivoting of said control lever from an engaged position to a release position, and means for retaining said control lever in release position to condition said brake actuating assembly for operation as an emergency brake.

3. A brake actuating mechanism including, in combination, a support, a foot-operated brake actuating lever fulcrumed intermediate its ends upon the support having a foot pad at one end thereof, said foot-operated lever being adapted to be connected with a brake actuating cable, a flat plate having an edge region provided with ratchet teeth pivotally mounted upon said support at a zone spaced from the fulcrum of the foot-operated lever, the axis of the pivot of said flat plate lying within the area defined by a circle having as the center of said circle the axis of the fulcrum of said lever and having as a radius the distance between the point of connection of said brake actuating cable and the axis of said fulcrum, pivotally mounted pawl means on said brake actuating mechanism arranged for engagement with the teeth of the plate to retain the foot-operated lever in brake-setting position, resilient means normally effective to bias the pawl means into engagement with the teeth on the plate, and manually operable cam means on said brake actuating mechanism operable independently of said resilient means for effecting disengagement of the plate and pawl means to release said foot-operated lever for movement to brake-release position.

4. A brake actuating mechanism including, in combination, a support, a foot-operated brake applying lever pivotally mounted intermediate its ends on the support having a foot pad at one end thereof, a ratchet plate member pivotally mounted upon said support at a region spaced from the pivotal support of the lever and provided with teeth on an edge surface, a pawl member on said brake actuating mechanism, the teeth of said ratchet plate member and pawl member being normally engageable to retain the lever in brake actuating condition, resilient means normally biasing said pawl member into engagement with the teeth of the ratchet plate member, cam means on said brake actuating mechanism for disengagement of said ratchet plate and pawl members, and manipulating means to actuate said cam means to effect disengagement of said ratchet plate and pawl member to release the foot-operated lever for movement to brake-releasing position.

5. A brake actuating mechanism including, in combination, a support, a foot-operated brake actuating lever fulcrumed intermediate its ends upon the support having a foot pad at one end thereof, said foot-operated lever being adapted to be connected with a brake actuating cable, a toothed ratchet members formed of sheet metal pivotally mounted upon said support at a region spaced from the fulcrum of the foot-operated lever, pivotally mounted pawl means on said brake actuating mechanism arranged for engagement with the teeth of the ratchet member to retain the lever in brake-setting position, spring means normally biasing the pawl means into engagement with the teeth of the ratchet member, and a pivoted supplemental cam lever on said brake actuating mechanism operable independently of said resilient means for effecting disengagement of the pawl means and ratchet member to release said foot-operated lever for movement to brake release position.

6. A brake actuating mechanism including, in combination, a support, a foot operated brake applying lever pivotally mounted intermediate its ends on said support having a foot pad at one end thereof, a ratchet plate member pivotally mounted upon such support at a region spaced from the pivotal support of the lever and provided with teeth on the edge surface, a pawl member on said brake actuating mechanism, the teeth of said ratchet plate member and said pawl member being normally engageable to retain the lever and brake actuating condition, resilient means normally biasing said pawl member into engagement with the teeth of said ratchet plate member, cam means on said brake actuating mechanism for disengagement of said ratchet plate and pawl members, said cam means including a cam surface on said pawl member, and a pivoted cam lever on said brake actuating mechanism cooperating with said cam surface.

References Cited in the file of this patent

UNITED STATES PATENTS

| | | |
|---|---|---|
| 224,964 | Stephenson | Feb. 24, 1880 |
| 633,880 | Miller | Sept. 26, 1899 |
| 1,974,197 | Smith | Sept. 18, 1934 |
| 2,132,954 | Jandus | Oct. 11, 1938 |
| 2,147,580 | McCarthy | Feb. 14, 1939 |
| 2,303,586 | Snell | Dec. 1, 1942 |
| 2,308,898 | Skareen | Jan. 19, 1943 |
| 2,309,454 | Heller | Jan. 26, 1943 |
| 2,405,956 | Jandus | Aug. 20, 1946 |
| 2,694,945 | Jandus | Nov. 23, 1954 |
| 2,722,136 | Krause | Nov. 1, 1955 |
| 2,835,140 | Cox | May 20, 1958 |

FOREIGN PATENTS

| | | |
|---|---|---|
| 18,329 | Great Britian | Dec. 10, 1914 |